United States Patent

[11] 3,593,638

[72] Inventor Dieter Rittman
   Calmbach Black Forest, Germany
[21] Appl. No. 767,282
[22] Filed Oct. 14, 1968
[45] Patented July 20, 1971
[73] Assignee Prontor-Werk Alfred Gauthier, G.m.b.H.
   Calmbach Black Forest, Germany
[32] Priority Oct. 18, 1967
[33] Germany
[31] P 15 97 363.4

[54] PHOTOGRAPHIC SHUTTER WITH ELECTONIC TIME FORMING DEVICE
   3 Claims, 5 Drawing Figs.
[52] U.S. Cl. .................................................. 95/53, 339/186
[51] Int. Cl. .................................................. G03b 9/58
[50] Field of Search .................................................. 95/53; 339/184, 186

[56] References Cited
UNITED STATES PATENTS
| | | | |
|---|---|---|---|
| 964,687 | 7/1910 | Patterson | 339/184 |
| 3,276,342 | 10/1966 | Rentschler et al. | 95/53 |
| 3,357,332 | 12/1967 | Helber et al. | 95/53 |
| 3,460,451 | 8/1969 | Starp et al. | 95/53 X |

Primary Examiner—Samuel S. Matthews
Assistant Examiner—Michael D. Harris
Attorney—March, Gillette and Wyatt ABSTRACT: A photographic shutter is provided having an electronic timing circuit means for the exposure time and a setter connected to it for setting the exposure time. Control means are connectable to the electronic timing circuit means to provide for additional exposure times or exposure time dependent on ambient lighting conditions. The control means is connectable to the circuit means by a plug when a setter has been adjusted to a certain setting position. Advantageously the shutter and the plug have interengaging portions permitting insertion of the plug only after the previous movement of the setter to the certain setting position. A change in the position of the setter is prevented when the plug is inserted.

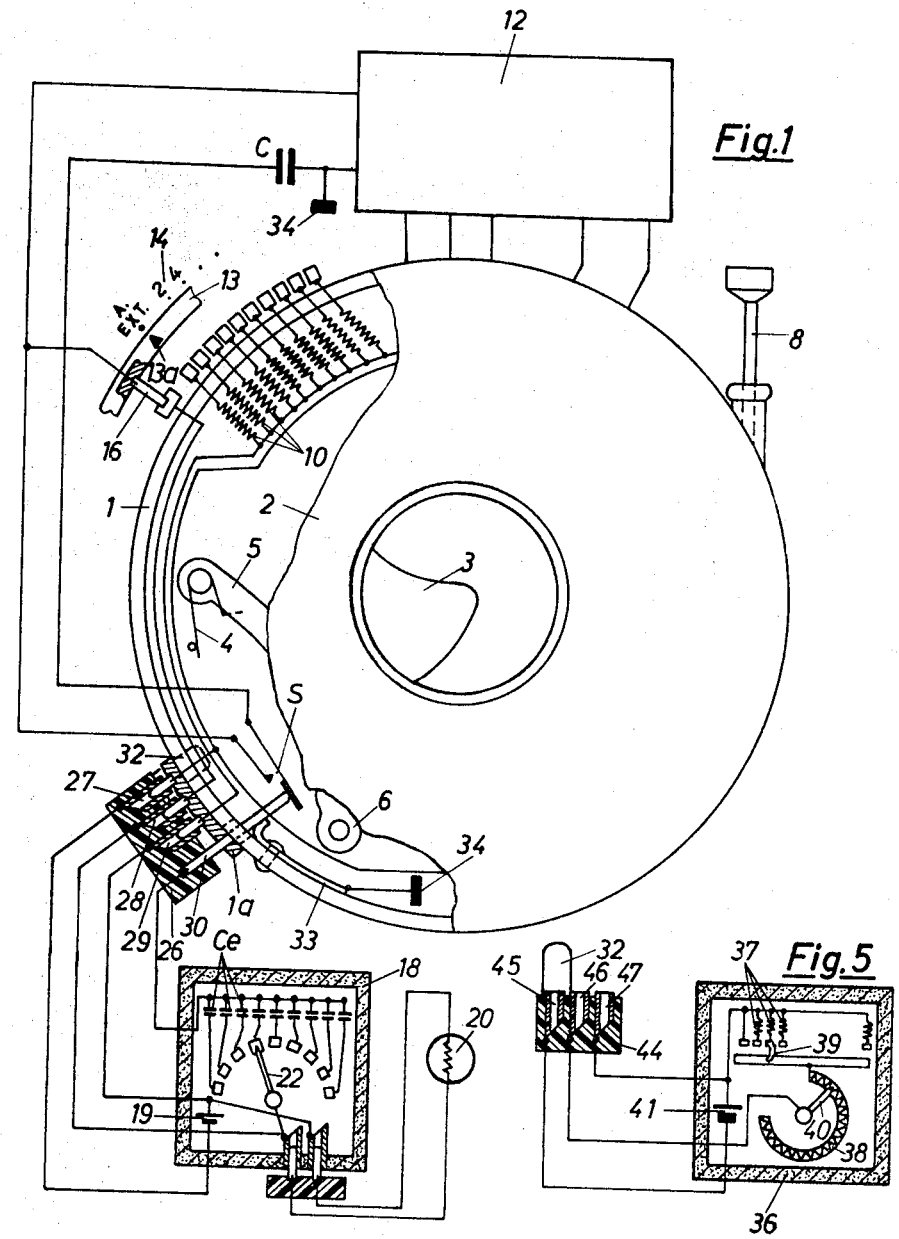

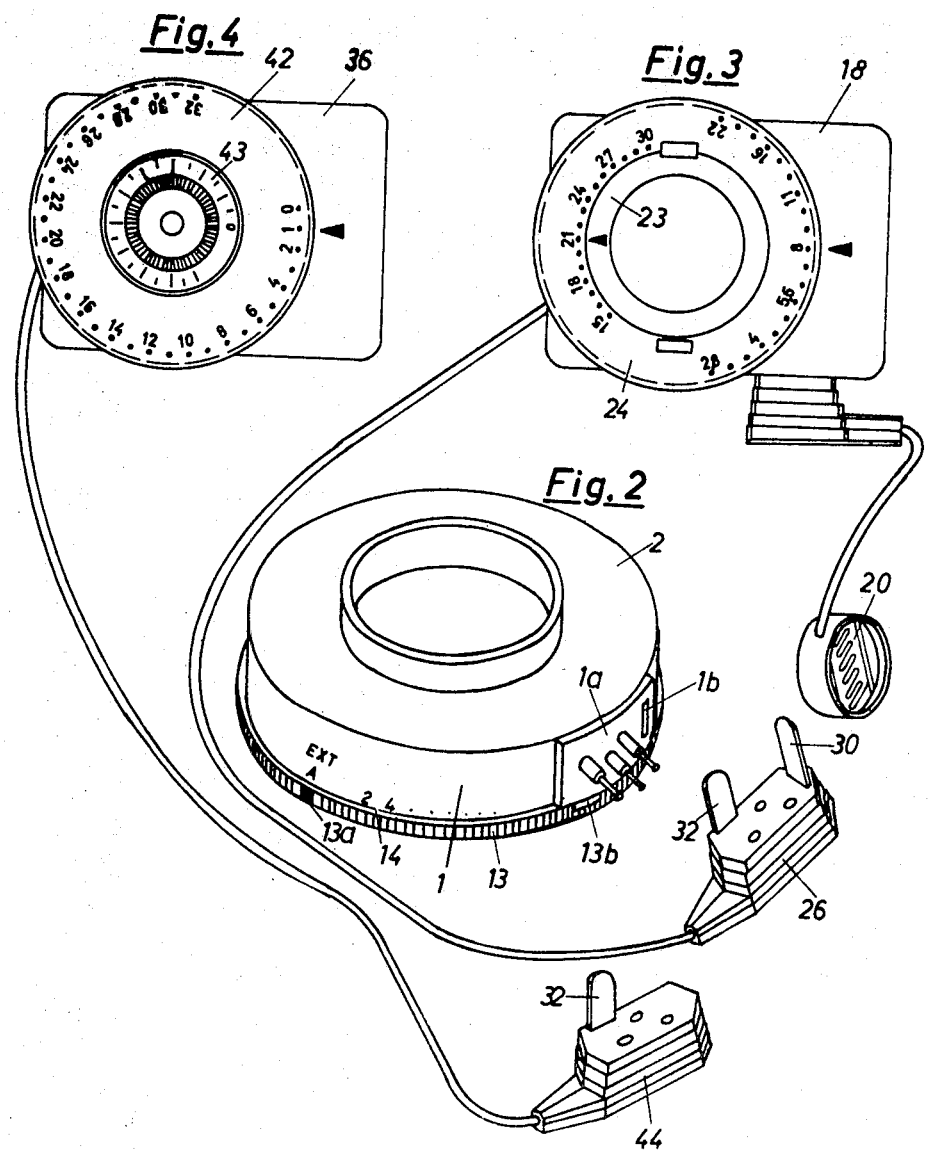

PHOTOGRAPHIC SHUTTER WITH ELECTONIC TIME FORMING DEVICE

This invention concerns a photographic shutter provided with manual means to set the exposure time thereof and an electronic timing device, to which shutter a control device serving for example to provide additional exposure times or exposure times controlled in dependence on the ambient lighting conditions may be connected by means of a plug connection after previously bringing the manual time setter of the shutter into a certain setting position.

Shutters of this type are already known, as are also the above-mentioned control mechanisms. Such a shutter therefore requires a certain degree of attention on the part of the photographer with respect to its mode of operation in cooperation with the control device, because not only is the device itself to be connected to the camera shutter, but also the time setter on the side of the camera has to be brought to the said certain setting position. If this setting action is omitted due to lack of attention of the photographer, then the control device, despite its attachment to the camera shutter, cannot fulfill its function and this in turn may lead to incorrect exposure.

It is the object of the invention to surmount this difficulty and according to the invention means are provided on the shutter and on the plug which by their mutual engagement make it possible to connect the plug only after the time setter has been brought to the said certain setting position, and prevent any displacement of the time setter after the plug has been connected.

This ensures that the photographer is initially compelled to move the time setter on the side of the camera to the special setting position when the exposure is to be timed by means of a control apparatus. On the other hand, any displacement of the time setter out of the said certain setting position is prevented as long as the control mechanism is plugged into the shutter.

In a preferred form the plug comprises a locking flap and the time setter is provided with a recess serving to receive said flap.

To simplify the mode of operation of the photographic shutter when working with more than one control device, one plug is provided with an additional pin which is formed in such a manner that when this plug is used, the pin is received in an aperture provided on the shutter housing and actuates a switch within said shutter housing. By this means the marks "EXT" and "AUTO" associated with the control devices are united on the shutter in one setting position, since the switch is actuated only when a particular control device is plugged in.

The present invention is described in greater detail hereinafter and illustrated in the accompanying drawings with reference to a shutter and two attachable control devices. In the drawings, FIG. 1 is a plan view of a shutter in part section, to which a control device is connected for exposure times controlled in dependence on the ambient lighting conditions, FIG. 2 is a perspective view of the shutter, FIG. 3 shows an embodiment of the above mentioned control device FIG. 4 and FIG. 5 show another control device respectively in plan and in section by means of which additional exposure timing may be effected.

In FIGS. 1 and 2 of the drawings, 1 is the housing of a photographic shutter and 2 a cover plate for said housing. A conventional mechanism for driving the shutter sectors 3 is accommodated in the housing 1, of which mechanism only a driving lever 5, biassed by a driving spring 4, and an intermediate lever 6 reciprocated thereby, are partly shown. The driving lever 5 is tensioned by a trigger member 8 in the shutter housing 1 and finally released, after which the lever returns to its starting position under the bias of the driving spring 4 and simultaneously moves the sectors 3 into the opening and closing positions.

Associated with the driving mechanism is an electromagnetic locking device which is controlled by an electronic timing device and which locks the driving mechanism in the open position of the sectors 3 for a required exposure time. This device is also well known and is therefore not described or illustrated. Of the electronic time control circuit, which is also of conventional design, only the stepped fixed resistors 10, which are fitted in the shutter housing 1 and determine the timing, the capacitor C associated therewith and the transistorized time switch 12, are indicated schematically. A resistor 10 giving a specific exposure time, is inserted in the circuit of the electronic timing device by means of an exposure time setter 13 which carries a setting mark 13a, cooperating with an exposure time scale 14, and a sliding contact 16.

Control devices may be attached to the above described shutter, by means of which either other exposure times not on the exposure time scale 14 may be achieved, or the exposure is determined in dependence on the intensity of the ambient light. When these devices are used, the fixed resistors 10 are disconnected from the circuit of the electronic timer. For this purpose, in this embodiment of the shutter, the time setter 13 with its mark 13a is brought to a setting position at the end of a scale 14 and indicated by the marks "A" and "EXT".

In FIG. 1 a control device is shown connected to the shutter by means of which device exposures are timed in dependence on the ambient light intensity. In the embodiment shown, the housing 18 of this device receives a battery 19 to which a photoresistor 20 is connected which replaces the fixed resistors 10. In addition, the housing 18 is provided with several capacitors $C_e$ of different values connected to the photoresistor 20, which capacitors take other exposure factors such as the diaphragm setting and film sensitivity into account. One of the capacitors $C_e$ is connected by means of a slide contact 22 in the circuit of the electronic time-forming device when using an exposure time controlled dependently on the ambient light intensity whilst at the same time the capacitor C in the shutter is cut out by means of a switch S. The slide contact 22 is adjustable by means of a double action setter provided on the device, which setter comprises a setting knob 23 for the film sensitivity, and a ring 24 for taking into consideration the diaphragm as shown in FIG. 3. The connection of the device to the shutter housing 1 is by means of a plug 26 which, in addition to the three contact sleeves 27, 28 and 29, carries a further contact pin 30.

In order to ensure that the plug 26 can be attached to the shutter housing 1 only after previous movement of the time setter 13 to the setting position "A," and prevent movement of this setter after the device is plugged in, the plug is provided, as shown in FIGS. 1 and 3, with a locking flap 32. A recess 13b, formed in the time setter 13, is associated with the locking peg 32. The arrangement is such that the recess 13b only assumes such a position when the setter 13 is adjusted to position "A" that, when the plug 26 is connected to the socket 1a on the side of the shutter, the locking peg 32 may be guided into the recess and thus enable the plug to be connected. The locking peg 32, in conjunction with the recess 13b, simultaneously presents turning movement of the setter 13. The above-mentioned contact pin 30 is received in a slot 1b provided on the housing 1 when the plug 26 is inserted and the pin is brought into contact with a contact 33 provided in the shutter housing 1, which contact is connected via "earth" points 34 to the electronic timing circuit. In this manner one of the capacitors $C_e$ is inserted in the circuit of the timer. At the same time, when the plug 26 is inserted, the capacitor C is switched off by actuation of the switch S. This is achieved by means of the contact pin 30 which is made sufficiently long for the purpose.

A device for obtaining exposure times which cannot be set on the scale 14 is shown in FIGS. 4 and 5. This device comprises several stepped fixed resistors 37 accommodated in a housing 36, and an infinitely variable resistor 38. The latter is designed so that the steps between the individual resistance values of the resistors 37 can be bridged by the resistor 38. The device also has two slide contacts 39 and 40, and a battery 41. For setting the sliding contacts 39 and 40 the device, as shown in FIG. 4, is provided with a setting ring 42 by means of which the slide contact 39 is moved, whilst a setting knob 43 serves to set the slide contract 40.

The exposure time control device is attached by means of a plug 44 which, in contrast to the plug 26 of the first control device described, is provided with only three contact sockets 45, 46, 47. Thus, when this device is used, only the fixed resistors 10 are cut out, whilst the capacitor C in the shutter, remains in circuit. The plug 44 also carries a locking pin 32 similar to the plug 26, which, in conjunction with the recess 13b, allows insertion of the plug only if the time setter 13 has been previously set to the position "EXT." The locking action in respect of the setter 13 is the same for the control device shown in FIGS. 4 and 5, as in the case of the previously mentioned device.

What I claim is:

1. A photographic shutter including electronic timing circuit means for the exposure time, a setter connected to said electronic timing circuit means for setting the exposure time, control means connectable to said electronic timing circuit means for additional exposure times or exposure times dependent on ambient lighting conditions, said control means being connectable to said circuit means by a plug when said setter has been adjusted to a certain setting position, said shutter and said plug having interengaging means permitting insertion of said plug only after the previous movement of said setter to said certain setting position, whereby a change in the position of said setter is prevented while said plug is inserted.

2. The photographic shutter of claim 1 wherein said plug has a locking pin and wherein said setter has a recess for receiving said pin.

3. The photographic shutter of claim 2 wherein said plug has an additional pin and wherein said shutter has a housing with an aperture therein to receive said pin when said plug is connected, said additional pin being engageable with a switch in said timing circuit inside said shutter housing.